Oct. 17, 1967    R. V. BEZ    3,348,050
PASSIVE INFRARED TRACKING AND RANGING SYSTEM
Filed July 15, 1957    4 Sheets-Sheet 2

INVENTOR.
ROBERT V. BEZ.
BY
ATTORNEYS.

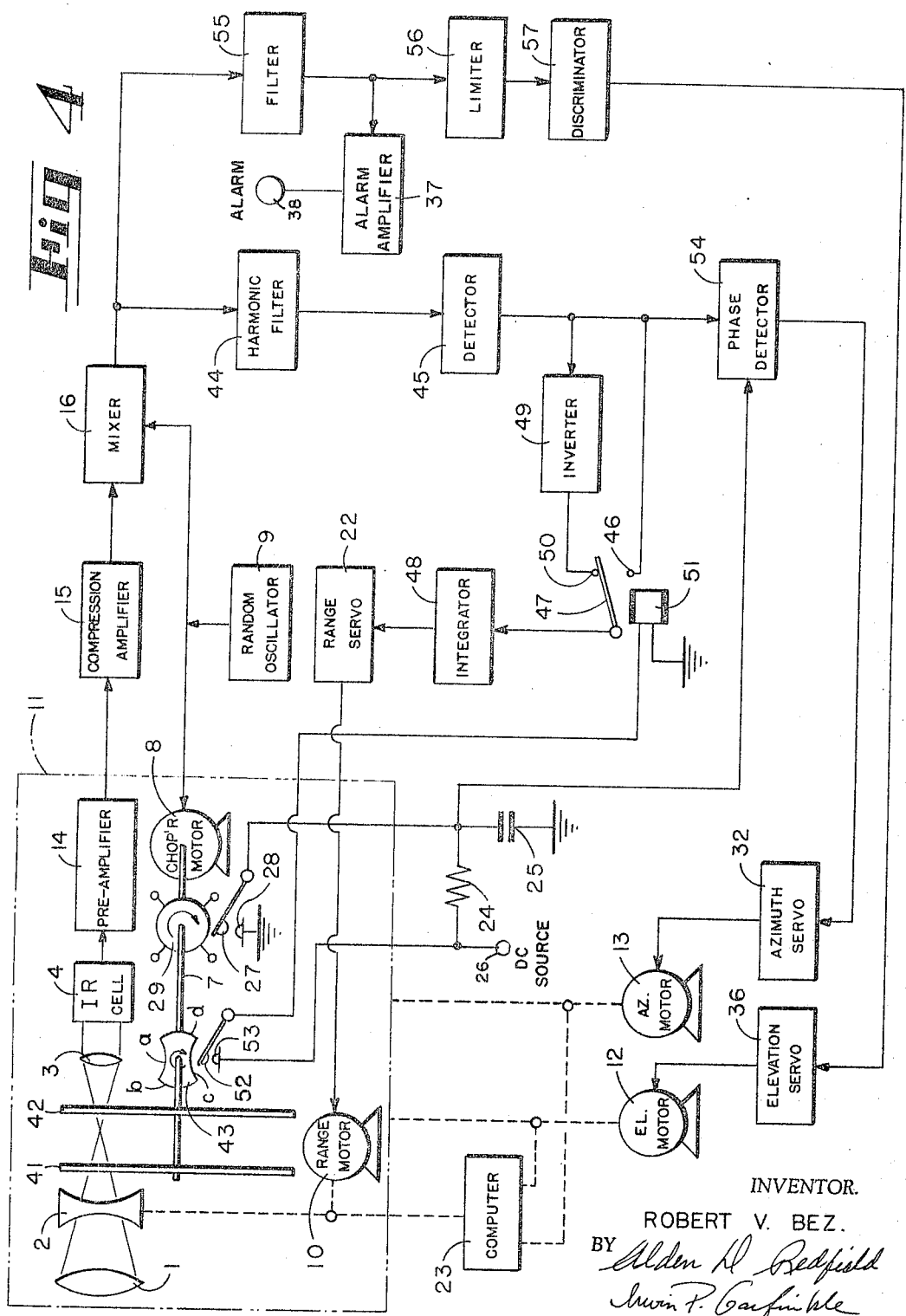

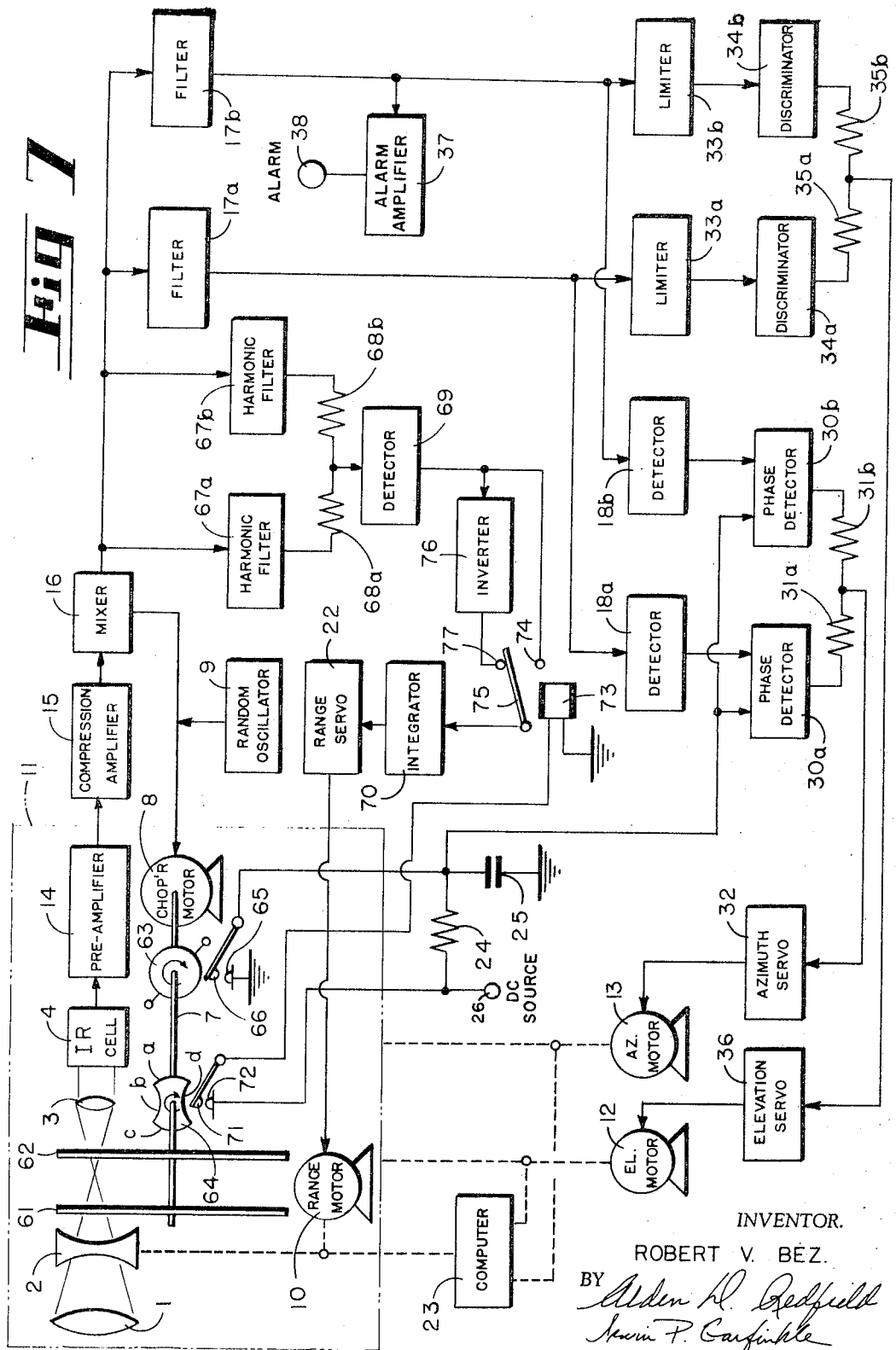

United States Patent Office 3,348,050
Patented Oct. 17, 1967

3,348,050
PASSIVE INFRARED TRACKING AND
RANGING SYSTEM
Robert V. Bez, Cincinnati, Ohio, assignor to Avco Manufacturing Corporation, Cincinnati, Ohio, a corporation of Delaware
Filed July 15, 1957, Ser. No. 672,542
12 Claims. (Cl. 250—83.3)

This invention relates to an infrared detector and more particularly to an infrared system for tracking targets in azimuth, elevation and range.

A most important military problem is the detection, tracking and ranging of enemy aircraft and missiles. Present devices such as radar and visual optical systems have many deficiencies. Radar, for example, requires heavy, space-consuming electronic equipment and is easily jammed. In addition, an enemy can detect and locate the sources of transmitted radar pulses at distances much greater than the effective range of the radar. Visual optical systems are useless at night. My invention utilizes a passive optical system in the infrared spectrum, and overcomes many of the disadvantages of radar and visual optics.

There are many ways known in the prior art for determining the range of objects in space by means of optical instruments. A first prior art method makes use of an optical photometer for measuring the intensity of the target. This method is not satisfactory since the output power of a target varies with the type of target and with throttle setting (of aircraft). Also, the output optical power from a target is attenuated before reception in unknown amounts because of lack of complete knowledge of the conditions of the optical path and, also, the received power from a target is a function of target aspect angle.

A second method of ranging employs a graduated reticle for measuring the apparent size of the target. This method is unsatisfactory with infrared radiating targets since the apparent size varies not only with the range, but also with target type, power setting, and with aspect angle.

Another method is by triangulation, but this requires base legs which are too long for easy mounting on aircraft and requires very stiff temperature-insensitive construction. This method also requires very accurate measurement of very small difference angles and it would be extremely difficult to stabilize the elements mounted on opposite wing tips of an aircraft. Moreover, as a 90 degree angle (abeam) is approached, the projection of the base leg approaches zero.

The systems embodied in this invention determine range by the position of the focal plane in a lens system. If a screen is placed at points along the optical axis of a perfect lens, and the rays from a point source are focused through the lens, blur circles will occur at the various points, but one position will be found where no blurring will occur. This position is the focal plane of the lens. As the screen is moved in either direction from the focal plane the blur circles become larger.

By placing a chopper grid having opaque bars and clear spaces equal to the image size at the focal plane, and moving the chopper grid across the optical axis, 100 percent modulation of the light is obtained. If the position of the chopper grid along the optical axis changes or if the position of the image changes due to a change in target distance, the chopper grid will be operating in a region of a larger blur circle. When the blur circle becomes as large as the dimension of bar plus a space, there will be no modulation of light, i.e., as a space opens up to one edge of the blur circle a bar will be closing at the opposite edge of the blur circle. By noting the position along the optical axis at which maximum chopper signal occurs, and knowing the focal length of the optics, a simple computer may be used to solve the distance to a target.

The major difficulty in determining range by this method arises because the degree of modulation changes very slowly as the chopper grid is moved in either direction from the focal plane and, therefore, it is difficult to servo on the maximum point. This fault is remedied by having two chopper grids, one before and one after the focal point. By displacing both grids with respect to the focal point, the signal due to one grid will increase while the signal due to the other grid is decreasing. Thus, operation on the differential sides of the sensitivity curves rather than on the broad maximum point is obtained. A servo motor may be used for translating the grids, the position of which may be calibrated in range.

Appropriate design of the same grids used for determining range can also be used for deriving tracking information. Thus, in accordance with this invention, tracking information, i.e., elevation and azimuth, is developed by constructing chopper grids with various space patterns. One direction (elevation) is resolved by using concentric rows of slots, each row having different spacings and thereby generating different frequencies. As a target moves in elevation, the image will traverse different rows of slots and thus different frequencies will be generated. The generated frequency may be applied to a frequency discriminator, the direct current output and polarity of which provide an error signal for an elevation servo motor system. The other direction (azimuth) is solved time-wise, i.e., there are recurring groups of slots having an angular relationship with the chopper grid shaft. Thus, as the target image moves in azimuth across the chopper grid, the generated frequencies remain unchanged, but the period that a beam traverses a particular grid segment during a fixed time interval changes, thereby changing the phase of the generated signal. The generated signal is applied to a phase discriminator, the direct current output and polarity of which provide an error signal for an azimuth servo motor system.

It is an object of this invention to provide a radiant energy system for automatically tracking a target in space simultaneously in range, elevation and azimuth.

It is another object of this invention to provide an infrared optical system for tracking a target in space simultaneously in range, elevation and azimuth.

Another object is to chop the image of a target in space into series of pulses of energy which may then be used for simultaneously deriving intelligence as to change in range, elevation and azimuth of said target.

Another object of this invention is to provide a system for automatically focusing images of objects in space.

It is still another object to provide a system for measuring the distance to a target in space by locating the focal plane of the target image in an optical system.

Another object is to provide an optical system for focusing images of targets in space and for determining range to said target by comparing the relative size of said images at points along the optical axis before and after the focal plane.

Another object is to provide an optical system for focusing an image of a target in space and for determining the angle of elevation of said target by means of a set of chopper grids arranged to traverse the axis of said optical system and provided with predetermined numbers of slots for generating frequencies corresponding to changes in elevation.

Still another object of this invention is to provide an optical system for measuring the azimuth angle of a target in space by determining the location of the target image on a chopper grid positioned for rotation across the axis of said optical system.

A more complete understanding of this invention may be had by a comprehensive study of the following detailed description and the accompanying drawing, in which:

FIG. 1 schematically illustrates a first embodiment of my invention provided for simultaneously tracking in range, elevation and azimuth;

Figure 5:
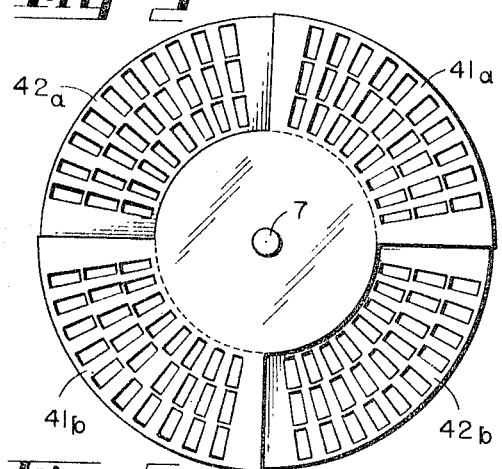
Figure 6:
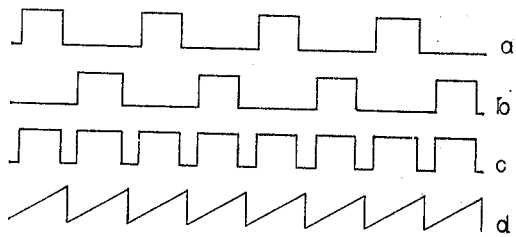
Figure 8:
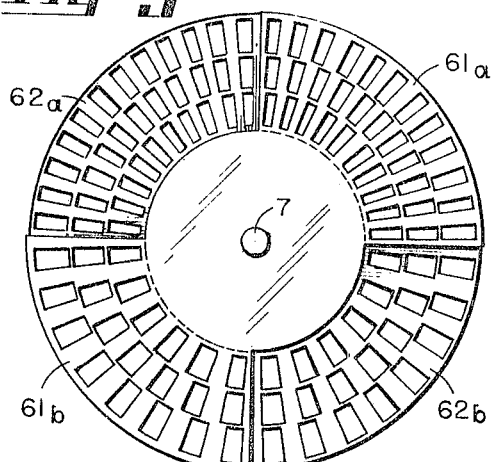

FIG. 4 schematically illustrates a second embodiment of my invention for simultaneously tracking in range, elevation and azimuth;

FIG. 5 illustrates the chopper grids used in the embodiment of FIG. 4;

FIG. 6 is a series of curves illustrating the operation of the second embodiment;

FIG. 7 schematically illustrates a third embodiment of my invention for simultaneously determining range, elevation and azimuth;

FIG. 8 illustrates the chopper grids used in the embodiment of FIG. 7; and

Figure 9:
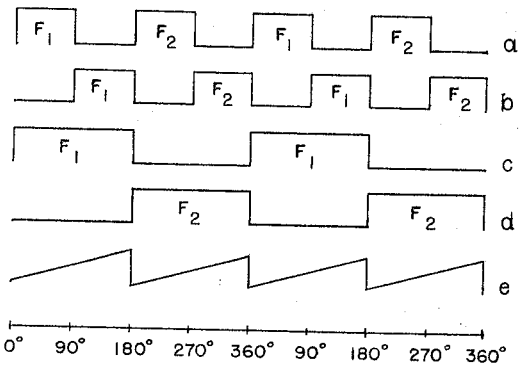

FIG. 9 is a series of curves illustrating the operation of the third embodiment.

Figure 1:
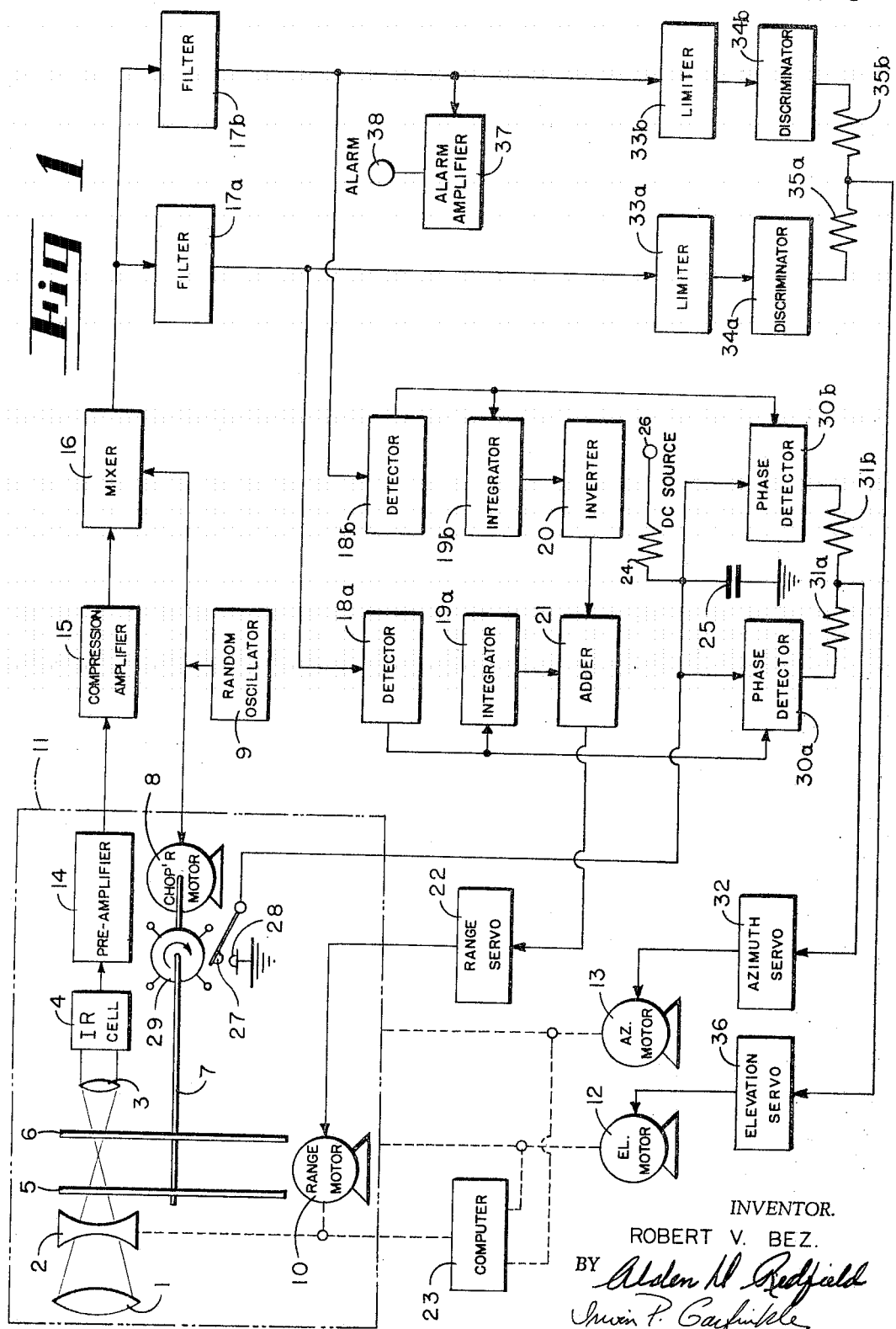

In accordance with a first preferred embodiment of my invention, as illustrated in FIG. 1, rays generated by a target in space are focused through a conventional system of lenses comprising a convex lens 1, a negative concave lens 2, and a convex lens 3 onto an infrared photoelectric cell 4. While I illustrate a lens system, it is understood that a system of reflectors is equally suitable. Further, although any type of photo-detector cell may be used in accordance with my invention, for use in an infrared system, I prefer cells composed of lead telluride for greatest sensitivity, while for high frequency response I prefer indium antimonide or germanium silicon.

A set of chopper grids 5 and 6 are fixedly mounted on the shaft 7 and are interposed in the optical path after the lens 2. The shaft 7 is below the focal point and parallel to the optical axis, and is driven by a synchronous motor 8, which, for a purpose to be described, is energized by a random oscillator 9 operating within prescribed limits. The lens 2 is movable along the optical axis by means of a reversible servo motor 10 for focusing in range, and the entire assembly is mounted on a gimbaled platform 11 for orientation of the optics in elevation and azimuth by means of a reversible elevation servo motor 12 and a reversible azimuth servo motor 13.

Figure 2:
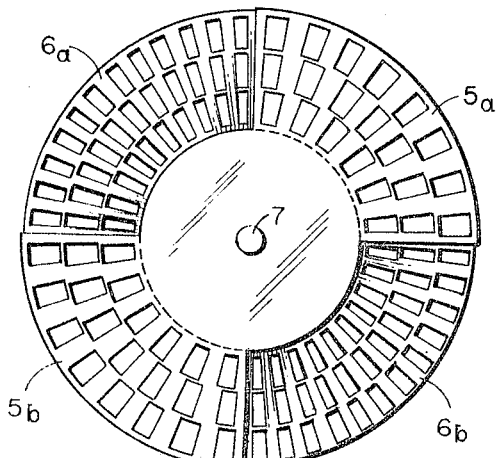
FIG. 2 illustrates the chopper grids used in the embodiment of FIG. 1.

As seen in FIG. 2, the chopper grids 5 and 6 each comprise two pie-shaped segments 5a, 5b, and 6a, 6b. Each of the segments constitutes an arc of 90 degrees and is arranged so that as the grids are rotated in a clockwise direction, a blur circle will be intercepted, first by the grid 6a, then by the grid 5b, next by the grid 6b, and then by the grid 5a. Although I illustrate grids having two segments, it is to be understood that the grids may be comprised of any equal number of segments, the total number encompassing 360 degrees so as to avoid loss of search time. Also, while I illustrate disc-shaped grids, it is clear that many other forms of grids are suitable. For example, drum-shaped grids arranged so that the periphery of the drum rotates through the optical path, and flat strips arranged for reciprocal motion across the optical path may also be used.

Each grid segment is provided with rows of axially spaced arcuate slots, and thus, as the grids are rotated across the optical axis, the light energy is chopped into short pulses. For a purpose to be described, the slots of the chopper grid 5 are designed to produce a series of pulses having a repetition frequency in a first band of frequencies and the chopper grid 6 is designed to produce pulses having a repitition frequency in a second band of frequencies. Each row of slots is designed to produce a different frequency within the respective band. By way of example, the grid 5 may have three rows having 6, 7, and 8 slots respectively, and the grid 6 may have 10, 11, and 12 slots, respectively. Thus, if the shaft 7 is rotated at 20 revolutions per second, the grids 5 and 6 will generate pulses having repetition frequencies of from 480 to 960 cycles per second. While three rows, having the stated number of slots, may be satisfactory, it is to be understood that any number of two or more rows may be used, and the number of slots may be varied within the physical limits of the grids and the response time of the infrared cell. The slots are the same size as the spaces and, in the first embodiment, the grids 5 and 6 positioned on the shaft 7 so that, initially, the size of the intercepted blur circles are at least equal or larger than the size of the slots.

The electronic circuitry for the system includes a preamplifier 14 coupled to the output of the infrared cell 4. For the purpose of minimizing induction pickup, and for reducing input capacities, the preamplifier 14 may be mounted on the platform 11 adjacent the cell. Because of the wide dynamic range of signals, the output from the preamplifier 14 may then be applied to a logarithmic compression amplifier 15 for further amplification. The outputs from the compression amplifier 15 and the random oscillator 9 are heterodyned in a mixer 16 to produce a voltage having components of the frequencies of the random oscillator 9, the compression amplifier 15, and the sum and differences thereof.

As previously noted, the chopper grid 5 is slotted so that light energy passing through the optical system and impinging on the infrared cell 4 produces bursts of electrical impulses in one frequency band and, similarly, energy passing through the grid 6 produces bursts of electrical impulses in a second frequency band. Since the synchronous chopper motor 8 is energized by the random oscillator 9, the generated frequencies at the compression amplifier 15 will vary at random and thus the system will not be subject to jamming by an enemy. Nevertheless, the generated frequencies will bear a fixed relationship within the prescribed limits to the random oscillator frequency, and when the outputs from the compression amplifier 15 and the random oscillator 9 are heterodyned in the mixer 16, the output from the mixer 16 will comprise fixed ranges of frequency components, the sum or difference ranges of frequencies due to grids 5 and 6 being designated F1 and F2, respectively. The output of mixer 16 may then be applied to band pass filters 17, the filter 17a being fixedly tuned to pass the band of frequencies F1 and the filter 17b being fixedly tuned to the band of frequencies F2.

For the purpose of determining range, the outputs from the filters 17a and 17b are applied, respectively, to detectors 18a and 18b, where the signals are demodulated and a wave form representing the intensity of the rays intercepted by the choppers 5 and 6 is developed. The outputs from each of the detectors 18 is applied to integrators 19a and 19b to provide two direct voltage outputs. The output of integrator 19b may be inverted in an inverter 20 and both outputs may then be algebraically added in a suitable adder 21 to produce a resultant voltage having a polarity representative of the direction of change in range. The resultant output, if any, is then amplified in a range servo amplifier 22 and then used for reversibly energizing the range motor 10.

As previously indicated, if the focal plane of the system comprising lenses 1 and 2 is midway between the chopper grids 5 and 6, then the system is correctly adjusted for range and the range motor will be deenergized. This is because both grids 5 and 6 intercept blur circles of the same size, and these blur circles cause equal modulation of the focused rays. Thus, although the alternate pulses generated from the infrared cell 4 will contain different components of frequency, the envelopes will have the same shape and size, and voltages of equal magnitude and opposite polarity will be compared in the adder 21.

On the other hand, if the focal plane of the lenses 1 and 2 is not midway between the chopper grids 5 and 6, then unequal blur circles will be intercepted and the focused rays will be modulated by different amounts, the smaller blur circle causing the greatest amount of modulation. With unequal modulation, an error signal will result and the range motor 10 will be energized in the proper direction to reposition the lens 2 until the focal plane is again midway between the chopper grids 5 and 6. The amount of translation of the lens 2 represents the change in range of a target, and if desired for computing purposes, this information may be fed into a computer 23 by mechanical or electrical means.

Because the output from the random oscillator 9 is continually varying within prescribed limits, the input to the various servo amplifiers is also continuously varying within prescribed limits, and this means the system is continually oscillating. This feature is considered one of the advantages of the system, since hunting and overshoot errors are averaged out and thereby substantially eliminated.

It is pointed out that the focal length of the optics must be sufficient to obtain the desired resolution in range without requiring impractical mechanical tolerances. While a straight optical system is illustrated, it is to be understood that a long focal length may be obtained in a small space by "folding" the optical path with mirrors. A further gain in focal length may also be obtained by using a microscope to magnify the change in focal position.

Figure 3:
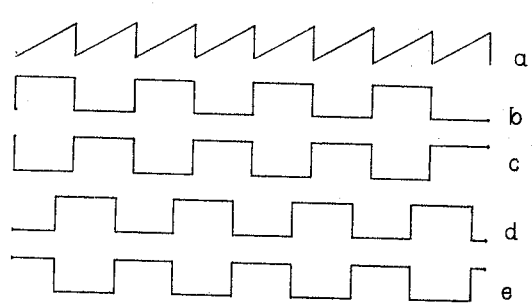
FIG. 3 is a series of curves illustrating the operation of the first embodiment.

The output from the detectors 18a and 18b is also used for the purpose of tracking in azimuth. The curves b to e in FIG. 3 represent the envelopes of the pulses generated by a point source intercepted by the chopper grids 5 and 6. If a target image is maintained at all times along a vertical line drawn through the axis of rotation of chopper grids 5 and 6 and the optical axis of the lens system, a blur circle will be intercepted first by the grid 6a for a quarter of a revolution and then by the grid 5b, the grid 6b, and the grid 5a in turn, and the waves generated by the grids 5 and 6 will appear as illustrated in the curves A and B, respectively. If the image should move to the left or to the right, then the envelope wave form generated by the grids 5 and 6 will shift. For example, if the image moves to the left, the grids 5 and 6 will generate pulses having an envelope as indicated in the curves D and E. To determine the difference in phase, the curves C and D are compared with a fixed phase saw tooth reference voltage such as illustrated in curve E.

The saw-tooth reference voltage is generated by means of a conventional R-C network comprising a resistor 24 and a condenser 25 connected in circuit with a suitable direct current source 26. One plate of the condenser 25 is grounded, while the other plate is connected through normally open switch contacts 27 and 28 associated with a cam 29 fixedly mounted on the shaft 7. The cam 29 is provided with four projections equally spaced every 90 degrees around its periphery. While the switch contacts 27 and 28 are open, the condenser 25 is charged at an exponential rate by the source 26. However, when the cam 29 is rotated to a position where the projections close the contacts 27 and 28, the condenser is short-circuited and is discharged to ground. The projections on the cam are arranged so as to coincide with the leading and trailing edges of the chopper grid segments and therefore, the sawtooth wave is fixed in phase with respect to the angular rotation of the grids.

The saw-tooth wave and the outputs from the detectors 18a and 18b are applied simultaneously to the synchronous phase detectors 30a and 30b, respectively. Depending on the direction of change of a target in azimuth, and hence the direction of phase shift, a direct voltage of a positive or negative polarity is developed across resistor 31a and 31b, and this voltage is then applied to an azimuth servoamplifier 32 and the azimuth motor 12 for reversibly driving the platform 11 until the blur circles are repositioned on the vertical centerline of the chopper grids. The amount and direction of rotation of azimuth motor 11 may also be fed to the computer 23 by any suitable electrical or mechanical means.

For tracking in elevation, the output from the band pass filters 17a and 17b is applied to limiters 33a and 33b and to frequency discriminators 34a and 34b, respectively. As was previously noted, the chopper grids 5 and 6 are each provided with several rows of slots, each now having a different number of slot to generate a different pulse repetition frequency. When the system is on target in elevation, i.e., when the image traverses the center row of slots, a center frequency is generated by the grids 5 and 6 in frequency bands F1 and F2, respectively, and frequency discriminators 34a and 34b are arranged so that the output is zero. However, if the target moves in elevation, then the blur circles will be displaced from the central row of slots to an inner or outer row, depending on the direction of change in elevation. This results in a change of the frequency generated by each grid segment, and hence in a change in frequency from the output of the band pass filters 17a, 17b and the limiters 33a, 33b. When applied to the frequency discriminators 34a and 34b, the changed frequency signals produce across the output resistors 35a and 35b a direct voltage having a polarity representative of the frequency change. This voltage is then applied to an elevation servo amplifier 36 and to the elevation servo motor 13 for reversibly driving the platform 11 in elevation. The amount and direction of rotation of motor 13 may also be fed to the computer 23 by any convenient means.

The system may also include an alarm system for alerting operating personnel of the presence of a missile or other high intensity target. The alarm system may comprise any variable conducting device such as an alarm amplifier 37 coupled to the output of either of the filters 17a or 17b, and biased for non-conduction except when its input signal exceeds predetermined magnitude. Thus, when the system is tracking in range on an ordinary target such as a jet aircraft, the intensity of the rays traversing the chopper grids 5 and 6 impinging on the infrared detector cell 4 is of a magnitude which is insufficient to cause conduction of the amplifier 37. However, in the event that the jet aircraft launches a rocket missile, then the extremely hot ignition gases from the missile generate waves of very high intensity, and output from the detector 17a is of sufficient magnitude to cause conduction of the alarm amplifier 37 and to operate a warning device or alarm such as a lamp or bell 38. A suitable signal may also be transmitted from the alarm amplifier to whatever countermeasure devices may be available.

A second preferred embodiment of this invention is illustrated in FIGS. 4–6, and employs chopper grids 41 and 42, which are identical in shape and size and in the number and location of the slots. The slots in each of the segments 42a and 42b are arranged in axially spaced rows, the middle, inner and outer rows having a predetermined number of slots for generating frequencies within a single band when traversed by a beam of infrared energy. The rows of slots do not extend over the entire arc of the grid segment, and it will be seen that wave forms of less than 90 degrees are generated by chopped infrared energy. Also, for a purpose to be explained, the grids 41 and 42 are positioned on the shaft so that the intercepted blur circles will usually be smaller in size than the width of the slots.

As in the first embodiment, detected infrared rays are focused through the lenses 1, 2 and 3, and directed onto the infrared cell 4, the rays being chopped by the grids 41 and 42. The grids 41 and 42 are mounted in fixed space relation on the shaft 7 which is driven at random speed by the chopper motor 8, and are positioned so that the grids will intercept blur circles before and after the focal plane of the lens 2. The shaft 7 carries the four-projection cam 14, and in addition carries a cam 43 provided with four 90 degree arcuate segments. As before, the output from the infrared detector cell 4 is amplified in the preamplifier 14 and in the logarithmic compression amplifier 15, and the amplified signals are heterodyned in the mixer 16 with the output from the random oscillator 9 for producing a frequency output in a fixed range.

Because the intercepted blur circles are smaller than the grid slots, signals comprising substantial harmonics will be developed. For measuring the comparative sizes of the intercepted blur circles to determine range, use is made of the fact that when circles of the same size are chopped by the grids 41 and 42, the resultant wave forms will be comprised of components having the same fundamental and harmonic frequencies. However, when the target moves in range thereby changing the position of the focal plane, the grids 41, 42 will then intercept blur circles of different sizes, and the harmonic content of each of the wave forms generated by the grids 41, 42 will vary in inverse proportion to the change in size of the intercepted blur circle. Thus, means are provided for comparing only the harmonic content of the waves generated by each of the grids, and for this purpose the output of the mixer 16 is first applied to a harmonic filter 44 which prevents the passage of the fundamental frequencies, permitting only the passage of the harmonic frequencies to a detector 45 for modulation.

The detector 45 is provided with first and second output circuits for separating the signals generated by each grid and for comparing the harmonics. The first detector output circuit is directly coupled through relay contact 46 and the relay armature 47 to an integrator 48, and the second detector output circuit is coupled to the integrator 48 through a phase inverter 49 and the relay contact 50 and the armature 47. The relay winding 51 is connected in circuit with the source 26 through the cam contacts 52, 53, which are operatively associated with the range cam 43.

The range cam 43 is provided with four 90 degree arcuate segments. When segment 43a or 43c opposes the contacts 52 and 53, the contacts are open, the relay winding 51 is deenergized, and the circuit to the integrator 48 through contact 46 and armature 47 is completed. When segment 43b or 43d opposes the contacts 52 and 53, the relay winding 51 is energized, and the second circuit to the integrator 48 through the inverter 49 becomes operative. The cam 43 is fixed on the shaft 7 so that the contacts 52 and 53 will be closed during the period when the segments of the grid 41 are traversing the optical axis of the lens system, and so that the contacts 52 and 53 will be open when the segments of the chopper grid 42 are traversing the optical axis. Thus, the detected harmonics generated by the grid 41 are applied to the integrator 48 through the phase inverter 49, while the detected harmonics generated by grid 42 are coupled directly to the integrator.

If the system is properly adjusted for range, the detected harmonics will be equal and opposite, and no output will result from the integrator 48. If the system is not adjusted in range, the detected harmonics will be unequal and an integrator output will result. The output from the integrator 48 will then be applied to the range servo amplifier 22 to operate the reversible range motor 10, thereby adjusting the axial position of the lens 2 in the proper direction to rebalance the system in range.

The azimuth system may best be understood by reference to the curves in FIG. 6. The curves A and B represent the envelopes of the series of pulses generated by the chopping action of the grids 41 and 42, respectively, each portion of the curve having a duration of less than 90 degrees. The envelope of the combined series of pulses from mixer 16 is shown in curve C. After applying to the harmonic filter the resultant envelope, C will be different in amplitude but will be unaltered in phase. This resultant envelope may be compared with the fixed reference voltage illustrated in curve D.

For this purpose, the output from the detector 45 is applied to a synchronous phase detector 54 for phase comparison with a saw-tooth wave, generated as in the first embodiment, and having a fixed reference phase. If the system is properly tracking in azimuth, then the filtered waveform of curve C will have a given phase relationship with the saw-tooth wave, and the synchronous phase detector 54 will yield no output. However, if the target moves in azimuth, the filtered waveform of curve C will shift in phase and an output having a polarity representing the change in direction of the target image will result from the detector 54. The detector output is then applied as before to the azimuth servo amplifier 32 and to the azimuth motor 13 for driving the platform 11 to correct for change in azimuth.

For tracking in elevation, the output from the mixer 16 is applied through a filter 55 and a limiter 56 to a frequency discriminator 57. If the system is properly adjusted in elevation, then the infrared rays will traverse the chopper across a middle row of slots to yield a given center frequency, and the discriminator is tuned so that the discriminator will yield no output. However, if the elevation of a target changes, then the infrared rays will traverse rows of slots which produce higher or lower frequencies and the discriminator 55 will yield an output having a polarity representing the change in frequency, and hence the direction of change in elevation. The output from the discriminator 55 is then applied to the elevation servo amplifier 36 and then to the elevation motor 12 for driving the platform 11 to correct target movement in elevation.

As in the first embodiment, the alarm system comprising the warning device 38 and the amplifier 37 may also be included.

Measuring range by comparing harmonic frequencies is advantageous since energy level of the harmonic frequencies varies more with changes in range than the energy levels of the fundamental frequencies. The system is thus made more sensitive by filtering out the fixed fundamental frequency components and measuring only the harmonics. However, the second embodiment has the disadvantage that a substantial amount of search time is lost because the chopper grid slots do not extend over the entire 90 degree arc of the grid segments. The third embodiment illustrated in FIGS. 7–9 takes advantage of the harmonic filter without the disadvantage of lost time, and for this purpose uses the chopper grids 61 and 62 illustrated in FIG. 8.

It will be noted that the chopper grid 61 is comprised of two segments, the first segment 61a having slots designed to generate a first band of frequencies, and the other segment 61b having slots designed to generate a second band of frequencies. As in the other embodiments, each row of slots is designed to generate a different frequency within its band. The segments 62a and 62b of grid 62 are identical in construction with the segments of grid 61, but are displaced axially and 90 degrees therefrom on the shaft 7; thus, when the grids are rotated, a first and second band of frequencies will be alternately generated every 180 degrees.

As in the prior embodiments infrared energy is focused through the lenses 1, 2 and 3 and directed onto the infrared cell 4. The chopper grids 61 and 62 are mounted on the shaft 7 so as to intercept the focused rays, and are driven at random speeds by the chopper motor 8. For a purpose to be hereinafter described, two cams 63 and 64 are fixedly mounted on the shaft 7. The output of the cell 4 is amplified in the amplifiers 14 and 15 and the output of the amplifier 15 is heterodyned in the mixer 16 with the output of the random oscillator 9 to obtain an output in fixed bands of frequency F1 and F2, representing the frequencies produced by the chopping action of grids 61 and 62, respectively.

In exactly the same manner as was done in the first embodiment, elevation is determined by applying the output from the mixer 16 to the filters 17a and 17b, the limiters 33a and 33b, and to the frequency discriminators 34a and 34b, thereby obtaining an output voltage representative of change in elevation.

Azimuth is also determined in a manner similar to that described in the first embodiment. Thus, the outputs from the filters 17a and 17b are applied to the detectors 18a and 18b to obtain the two series of positive pulses for comparison in the phase detectors 30a and 30b with a fixed phase saw-tooth wave. The envelope wave form of pulses produced at the mixer 16 by grids 61 and 62 are illustrated in FIG. 9 by the curve A and B, respectively, the alternate pulse being comprised of frequencies F1 and F2.

The output frequencies from mixer 16 is separated by the band pass filters 17a and 17b, and applied to the detectors 18a and 18b for demodulation. The outputs from detectors 18a and 18b are represented, respectively, by the curves C and D, each wave having a duration of 180 degrees.

For the purpose of producing the saw-tooth wave illustrated by the curve E (for measuring the phase displacement of the curves C and D when a target moves in azimuth), the cam 63 is provided with only two projections so that the condenser 25 is grounded through contacts 65 and 66 only once every 180 degrees. The outputs from the phase detectors 30a and 30b are added across the resistors 31a and 31b, the magnitude and polarity of this voltage representing the change in azimuth of a target. This voltage is then used for energizing the azimuth motor 12 after amplification in the azimuth servo amplifier 32.

For determining range, the output from the mixer 16 is applied to the harmonic filters 67a and 67b, the harmonic filters being tuned to pass the harmonics of frequency F1 and F2, respectively. The outputs from the filters 67a and 67b are taken from the resistors 68a and 68b, and then applied to the detector 69. The output from the detector 69 is then applied to the integrator 70 through two alternate paths as determined by the position of the cam 64. Thus, when either cam segment 64a or 64c opposes the contacts 71 and 72, the circuit through the relay windings 73 is closed, thereby closing a first path through the relay contact 74 and the armature 75. When either cam segment 64b or 64d opposes the contacts 71 and 72, these contacts are open and the relay winding 73 is de-energized, and a second path is established through an inverter 76, the contact 77, and the armature 75. Since the second path is through the inverter 76, and since this path is operative during alternate 90 degrees of rotation, the harmonics generated by grid 61 will be inverted with respect to the harmonics generated by grid 62. If the system is in focus for range, the harmonics will be equal and will cancel when applied to the integrator 70 and thus, the range motor 10 will not be energized. However, if the system is not in focus for range, the harmonic content of the voltage generated by the grids 61 and 62 will not be equal, and any difference will result in an output voltage from the integrator 70 and range servo amplifier 26. The polarity will represent the change in direction of range, and the range motor 10 will be energized in the proper direction.

Although the three embodiments of this invention have been disclosed as infrared systems for use in tracking targets in space, it is understood that my invention is not limited thereto, but is intended to encompass optical systems operating in all light spectrums, and the system may have other uses—for example, the ranging system may be used for automatically focusing a television or moving picture camera. Moreover, while a refractive system is illustrated, the principles of this invention are equally applicable to reflective systems.

Further, while I determine range by sampling radiant energy by means of grids at two spaced locations along the optical axis of the focusing system, it is also my intention to encompass systems wherein only one grid is used, and the focal point is displaced to two locations with respect to the grid.

Also, while in each of the embodiments, elevation is determined by frequency discrimination, and azimuth by phase detection, it is apparent that the function can be reversed by re-positioning of the chopper grids with respect to the optical axis.

Since these and other modifications and uses of my invention will be apparent to persons skilled in the art, it is my intention that the invention be limited only by the scope of the annexed claims as read in the light of the prior art. Having thus described three exemplary embodiments of my invention,

What I claim is:

1. In a system for tracking targets in space, the combination comprising: means for focusing images of said target to a focal point; first and second opaque chopper grids arranged for alternately traversing the axis of said focusing means; said first grid being mounted for traversing said axis before said focal point, and said second grid being mounted for traversing said axis after said focal point; said grids and said focusing means being relatively movable along said axis; each of said grids having spaced rows of slots whereby said image will be chopped by said slots when traversed by said grids so that alternate series of pulses are produced; each of said rows having a different number of slots for producing series of pulses having different repetition frequencies.

2. The invention as defined in claim 1 wherein said focusing means is a lens, and wherein said images are light images; and means for converting said series of pulses into series of electric pulses.

3. The invention as defined in claim 2 and means for separating said series of electric pulses due to said first grid from said series of electric pulses due to said second grid; means for demodulating said separated series of pulses; means for comparing the average magnitudes of said demodulated separated series of pulses and for adjusting the relative position of said lens and said chopper grids until said demodulated separated series of pulses are of an equal average magnitude; a source of reference voltage having a phase fixed with respect to the motion of said grids across the optical axis of said lens; means for comparing the phase of said demodulated separated series of pulses with said voltage source; and means for re-orienting the lens on one axis until said demodulated separated series of pulses are of the same phase as said reference voltage; a frequency discriminator network tuned to the frequency of a predetermined row of slots; means for producing an output from said networks representing the difference in frequency from the frequency of said predetermined row; and means for reorienting said lens along a second axis until said output is zero.

4. In an optical tracking system, the combination comprising: a lens for focusing rays of light to a focal point; first and second opaque chopper grids fixedly spaced on a rotatable shaft, each of said chopper grids comprising at least one segment, the segments of said first and second grids being alternately disposed around the periphery of said shaft, each of said segments having a plurality of axially spaced rows of slots, each of said rows having a predetermined different number of slots; means rotatably mounting said shaft so that the segments of said first grid traverse the optical axis of said lens before said focal point, and so that said segments of said second grid traverse said optical axis after said focal point, whereby said rays of light will be interrupted by the opaque portions of said grids and will be permitted to pass through said slots, thereby producing alternate series of pulses of light; means for comparing the average intensities of said alternate series of pulses of light to locate said focal point along said optical axis; means for determining the phase with respect to a reference of said alternate series of pulses of light to locate the position of said focal point in one direction perpendicular to said axis; and means responsive to the number of pulses of light in each series for determining the location of said focal point in a second direction mutually perpendicular to said axis and said first direction.

5. In an optical tracking system, the combination comprising: a lens for focusing images to a focal point; first and second opaque chopper grids fixedly spaced on a shaft, said lens and said shaft being relatively movable along the optical axis of the lens; each of said chopper grids comprising at least one segment, the segments of said first and second grids being alternately disposed around the periphery of said shaft; each of said segments having a plurality of axially spaced arcuate rows of slots; means for rotating said shaft, said shaft being rotatably mounted parallel to and adjacent the optical axis of said lens so that the segments of said first grid traverse said optical axis before said focal point and so that said segments of said second grid traverse said optical axis after said focal point, whereby light passing along the optical axis of said lens will be chopped into alternate series of pulses of light; each row in said first chopper grid having predetermined numbers of slots for chopping said rays into series of pulses of light in a first range of frequencies, and each row in said second chopper grid having a different number of slots for chopping said rays into series of pulses of light in a second range of frequencies; means for converting said alternate series of pulses of light into alternate series of electric pulses; means responsive to the frequency of each series of electric pulses for determining the rows traversed by said focused images; a source of reference voltage having a fixed phase with respect to the rotation of said shaft; means for comparing the phase of said series of electric pulses with said reference voltage for determining the location of said focused images along the traversed rows; and means for comparing the average magnitude of said alternate electric pulses to determine the location of said focal point along the optical axis of said lens.

6. The invention as defined in claim 5 wherein said means for rotating said shaft comprises a synchronous motor energized by a random oscillator, and wherein said alternate series of electric pulses are heterodyned with the output of said random oscillator.

7. In an optical tracking system, the combination comprising: a lens for focusing rays of light to a focal point; first and second chopper grids fixedly spaced on a shaft, said lens and said shaft being relatively movable along the optical axis of the lens; each of said chopper grids comprising a plurality of segments, the segments of said first and second grids being alternately disposed around the periphery of said shaft; each of said segments having a plurality of spaced rows of slots, said slots extending over less than the entire width of said segment, said segments being identical in size shape and in the disposition of said rows of slots; means for rotating said shaft so that said segments of said first grid traverse said optical axis before said focal point and so that said segments of said second grid traverse said optical axis after said focal point; each of said rows of slots having predetermined numbers of slots for chopping said rays of light into alternate series of pulses of light in a given frequency range; means for converting said alternate series of pulses of light into alternate series of electric pulses; means responsive to the frequency of each series of pulses for determining the rows of slots traversed by said focused images; a source of reference voltage having a fixed phase with respect to the rotation of said shaft; means for comparing the phase of at least one series of pulses with said reference voltage for determining the location of said focused images along the traversed rows of slots; means for separating the series of pulses generated by said first grid from the series of pulses generated by said second grid; means for filtering out the fundamental frequency components of said series of pulses; and means for comparing the average intensity of the harmonic frequency components of said series of pulses for determining the location of said focal point along said optical axis.

8. The invention as defined in claim 7 wherein said means for rotating said shaft comprises a synchronous motor energized by a random oscillator, and wherein said alternate series of electric pulses are heterodyned with the output of said random oscillator.

9. In an optical tracking system, the combination comprising: a lens for focusing images to a focal point; first and second identical opaque chopper grids fixedly spaced on a shaft, said lens and said grids being relatively movable along the optical axis of the lens; each of said chopper grids comprising a plurality of segments, the segments of said first and second grids being alternately disposed around the periphery of said shaft; each of said segments having a plurality of arcuate rows of slots; means for rotating said shaft, said shaft being rotatably mounted parallel to and adjacent the optical axis of said lens so that the segments of said first grid traverse said optical axis before said focal point and so that said segments of said second grid traverse the said optical axis after said focal point; the alternate segments of each of said grids having predetermined numbers of slots in each of said rows for alternately chopping said focused images into pulses of light having frequencies within a first and a second range, and each row in said grids having a different number of slots; said segments being disposed around said shaft so that said first and second range of frequencies will alternately be generated for 180 degrees; means for converting said alternate series of pulses of light into series of electric pulses; means for filtering out the fundamental frequency components of said series of electric pulses; and for separating the harmonic frequency components generated by said first and second grids; means for comparing the average intensity of said separated harmonic components to determine the location of said focal point along said optical axis; means responsive to the frequency of each series of pulses for determining the rows traversed by said focused images; a source of reference voltage having a fixed phase with respect to the rotation of said shaft; means for comparing the phase of said reference voltage with the phase of said series of pulses for determining the location of said focal point along a row of slots.

10. The invention as defined in claim 9 wherein said means for rotating said shaft comprises a synchronous motor energized by a random oscillator, and wherein said alternate series of electric pulses are heterodyned with the output of said random oscillator.

11. An optical system for automatically tracking a target in space comprising: focusing means for focusing images of said target to a focal point, said focusing means having an optical axis; first servo means for orientating said optical axis in a first dimension; second servo means for orientating said optical axis in a second dimension perpendicular to said first dimension; image chopping means for chopping said images of said target into series of pulses of energy having a predetermined phase and repetition frequency at a given chopping speed when said optical axis is aligned with said target in said first and second dimensions, and deviating from said predetermined phase and repetition frequency when said optical axis is not in alignment with said target; said image chopping means comprises first and second grids spaced apart along said optical axis, said first grid being positioned before said focal point and said second grid being positioned after said focal point, and wherein each of said grids comprises at least one opaque segment having a plurality of spaced rows of slots, each row having a different number of slots; means for deriving a first signal in response to a deviation from said predetermined phase, said first servo means being energized by said first signal; and means for deriving a second signal responsive to a deviation from said predetermined frequency, said second servo means being energized by said second signal, whereby said optical system automatically tracks said target in said first and second dimensions.

12. The invention as defined in claim 11, and third servo means for translating said focusing means along said optical axis for adjusting said focal point in a third dimension mutually perpendicular to said first and second dimensions; means for comparing the average intensity of said pulses produced by said first grid with the average intensity of said pulses produced by said second grid to derive a third signal when the average intensities of said pulses produced by said first and second grids are unequal, said third servo being energized by said third signal.

References Cited

UNITED STATES PATENTS

| | | | |
|---|---|---|---|
| 2,421,012 | 5/1947 | Chew | 244—14 |
| 2,484,914 | 10/1949 | Spielman | 250—233 |
| 2,514,284 | 7/1950 | Le Page | 250—233 |
| 2,524,807 | 10/1950 | Kallmann | 88—1 |
| 2,565,213 | 8/1951 | Falkenstein | 244—14 |
| 2,582,728 | 1/1952 | Walker | 250—233 |
| 2,631,489 | 3/1953 | Golay | 250—233 |
| 2,659,828 | 11/1953 | Elliot | 244—14 |
| 2,713,134 | 7/1955 | Eckweiler | 244—14 |
| 2,724,183 | 11/1955 | Edison | 250—233 |
| 2,820,906 | 1/1958 | Miller | 244—14 |
| 2,877,356 | 3/1959 | Iddings | 250—233 |
| 2,943,204 | 6/1960 | Greenlee et al. | 250—233 |
| 2,967,247 | 1/1961 | Turck | 250—233 |

OTHER REFERENCES

OPTAR—A New System of Optical Ranging, Electronics, April 1950, pp. 102–105.

ARCHIE R. BORCHELT, *Primary Examiner.*

N. H. EVANS, F. W. STRADER, C. L. JUSTUS, D. G. BREKKE, R. A. FARLEY, *Examiners*